US009494012B2

(12) United States Patent
Falcone et al.

(10) Patent No.: US 9,494,012 B2
(45) Date of Patent: Nov. 15, 2016

(54) FOAMED CEMENT COMPOSITIONS CONTAINING METAL SILICIDES USABLE IN SUBTERRANEAN WELL OPERATIONS

(75) Inventors: James S. Falcone, Palm Beach Gardens, FL (US); Paul H. Krumrine, Hanover, PA (US); Michael Lefenfeld, New York, NY (US)

(73) Assignee: SIGNA CHEMISTRY, INC., New York, NY (US)

( * ) Notice: Subject to any disclaimer, the term of this patent is extended or adjusted under 35 U.S.C. 154(b) by 229 days.

(21) Appl. No.: 14/126,350

(22) PCT Filed: Jun. 14, 2012

(86) PCT No.: PCT/US2012/042477
§ 371 (c)(1),
(2), (4) Date: Jul. 2, 2014

(87) PCT Pub. No.: WO2012/174251
PCT Pub. Date: Dec. 20, 2012

(65) Prior Publication Data
US 2015/0191993 A1    Jul. 9, 2015

Related U.S. Application Data

(60) Provisional application No. 61/496,881, filed on Jun. 14, 2011.

(51) Int. Cl.
| C04B 7/00 | (2006.01) |
| C04B 14/04 | (2006.01) |
| E21B 33/14 | (2006.01) |
| C09K 8/58 | (2006.01) |
| E21B 43/24 | (2006.01) |
| C04B 7/02 | (2006.01) |
| C09K 8/46 | (2006.01) |
| E02D 3/12 | (2006.01) |
| E21B 33/138 | (2006.01) |

(52) U.S. Cl.
CPC ............ *E21B 33/14* (2013.01); *C04B 7/02* (2013.01); *C09K 8/46* (2013.01); *C09K 8/58* (2013.01); *E02D 3/12* (2013.01); *E21B 33/138* (2013.01); *E21B 43/24* (2013.01); *E21B 43/2408* (2013.01)

(58) Field of Classification Search
CPC . C04B 14/04; C04B 22/00; C04B 2103/304; C09K 8/58; C09K 8/46; E02D 3/12; E21B 33/14; E21B 33/138; E21B 43/2408; E21B 43/24
See application file for complete search history.

(56) References Cited

U.S. PATENT DOCUMENTS

| 3,097,694 A | 7/1963 | Kerver |
| 3,482,636 A | 12/1969 | Crowe |
| 3,690,376 A | 9/1972 | Zwicky et al. |
| 3,707,386 A | 12/1972 | Kurz |
| 3,804,643 A | 4/1974 | Arita et al. |
| 3,826,658 A | 7/1974 | Nicholas |
| 4,020,027 A | 4/1977 | Nicholas et al. |
| 4,147,615 A | 4/1979 | Leas |
| 4,718,490 A | 1/1988 | Uhri |
| 5,063,967 A | 11/1991 | Stephens |
| 5,083,615 A | 1/1992 | McLaughlin et al. |
| 5,343,941 A | 9/1994 | Raybon |
| 5,402,846 A | 4/1995 | Jennings et al. |
| 6,169,058 B1 | 1/2001 | Le et al. |
| 6,224,793 B1 | 5/2001 | Hoffman |
| 6,929,865 B2 | 8/2005 | Myrick |
| 6,981,548 B2 | 1/2006 | Wellington et al. |
| 7,111,683 B2 | 9/2006 | Nelson et al. |
| 7,740,068 B2 | 6/2010 | Ballard |
| 7,811,541 B2 | 10/2010 | Lefenfeld et al. |
| 7,926,567 B2 | 4/2011 | Harris et al. |
| 7,946,342 B1 | 5/2011 | Robertson |
| 8,007,762 B2 | 8/2011 | Lefenfeld et al. |
| 8,372,371 B2 | 2/2013 | Lefenfeld et al. |
| 2003/0141064 A1 | 7/2003 | Roberson, Jr. |
| 2006/0002839 A1 | 1/2006 | Lefenfeld et al. |
| 2012/0037368 A1 | 2/2012 | Eick et al. |

FOREIGN PATENT DOCUMENTS

WO    2012174255 A1    12/2012

OTHER PUBLICATIONS

International Search Report and Written Opinion for PCT/US2012/042477 mailed Oct. 15, 2012, 13 pages.
International Search Report and Written Opinion of PCT Application No. PCT/US2012/047665 dated Jan. 29, 2014.
International Preliminary Report on Patentability of PCT Application No. PCT/US2013/047665 dated Dec. 31, 2014.
International Search Report of PCT Application No. PCT/US2012/042482 dated Sep. 7, 2012.

(Continued)

*Primary Examiner* — Anthony J Green
(74) *Attorney, Agent, or Firm* — J.A. Lindeman & Co., PLLC

(57) ABSTRACT

The invention relates to cement compositions containing a metal silicide such as an alkali metal silicide or an alkaline earth metal silicide. Upon mixing with water, the metal silicide reacts to generate hydrogen gas, a silicate, and heat—each of which is advantageous for the large variety of uses to which cements are put. The invention relates to a foamable cement composition comprising about 99.999 wt % to about 98.5 wt % of a cement, and about 0.001 wt % to about 1.5 wt % of a metal silicide or a mixture of metal silicides. Concretes and grouts containing the cement composition are also disclosed. Other embodiments provide methods for forming cement structures, including in subterranean formations and wells.

22 Claims, 2 Drawing Sheets

(56) References Cited

OTHER PUBLICATIONS

International Preliminary Report on Patentability of PCT Application No. PCT/US2012/042482 dated Dec. 17, 2013.
International Preliminary Report on Patentability of PCT Application No. PCT/US2012/044277 dated Mar. 25, 2014.
Borchardt, John K. : "In-Situ Gelation of Silicates in Drilling, Well Completion and Oil Production, Shell Development Company," Westhollow Research Center, Houston, Tx.
Cole et al.: "Water Control for Enhanced Oil Recovery," Halliburton Services, Society of Petroleum Engineers of AIME, 1981.
Hower et al.: "Selective Plugging of Injection Wells by in Situ Reactions," Paper presented at Secondary Recovery Symposium in Wichita Falls, Tx, Nov. 19-20, 1956.
Krumrine et al.: "Profile Modification and Water Control With Silica Gel-Based Systems," Society of Petroleum Engineers, Paper presented at the International Symposium on Oilfield and Geothermal Chemistry held in Phoenix, Arizona, Apr. 9-11, 1985.
Resnvold et al.: "Recompletion of Wells to Improve Water-Oil Ratio," Society of Petroleum Engineers, Paper presented at regional meeting Apr. 2-4, 1975.
Singh et al.: "Fused Chemical Reactions: The Use of Dispersion to Delay Reaction Time in Tubular Reactors," Ind. Eng. Chem. Res., vol. 37, pp. 2203-2207, 1998.
Smith et al.: "A Special Selant Process for Subsurface Water Production," Society of Petroleum Engineers, Paper presented at 1978 Rocky Mountain Regional Meeting Apr. 20-21, 1978.
Usaitis, Vytautas: "Laboratory Evaluation of Sodium Silicate for Zonal Isolation," Master's Thesis, University of Stavanger, Stavanger, Norway, Jun. 30, 2011.
Vinot et al.: "Formations of Water-Soluble Silicate Gels by the Hydrolysis of a Diester of Dicarboxylic Acid Solubized as Microemulsions," Paper presented at 60th Annual Technical Conference and Exhibition of the Society of Petroleum Engineers held in Las Vegas, NV Sep. 22-25, 1985.
A Wallace Signa Chemistry, Inc. "Commercialization of Portable Hydrogen [Presentation]," Fuel Cell Seminar, Nov. 2011 [retrieved Oct. 27, 2013]. Retrieved from the Internet: <URL: http://www.fuelcellseminarcom/media/9030/com34-5%20wallace.pdf>; slides 4-5.
Zhu Yon, "Technical Practice for Comprehensively Reinforcing Historic Buildings Adjacent to Deep Foundation Pit of Fluidal Plastic Soft Soil", Science and Technology Information in Building, vol. 1, pp. 23-28, Mar. 2011 (Translated from original Chinese).

CONCRETE SAMPLES IN EXAMPLE 1, WITH AND WITHOUT SODIUM SILICIDE

FOAMED CEMENT COMPOSITIONS CONTAINING METAL SILICIDES USABLE IN SUBTERRANEAN WELL OPERATIONS

CROSS REFERENCE TO RELATED APPLICATIONS

This application is a 371 of PCT/US2012/042477 filed on Jun. 14, 2012, which claims priority under 35 USC §119 to U.S. Provisional Application No. 61/496,881, filed Jun. 14, 2011, the entire disclosure of which are both incorporated by reference.

FIELD OF THE INVENTION

This invention relates to the field of cements and cementing operations. More specifically, the invention relates to foamable cement compositions containing alkali metal silicides, their use in making lightweight foamed cements, concretes and grouts, as well as methods of using foamable cement compositions, particularly in subterranean operations involving wells and drilling.

BACKGROUND OF THE INVENTION

Cements and cement structures are commonplace—both in industrial applications and in everyday life. For example to recover natural resources such as gas, oil, and water residing in subterranean formations or zones a wellbore is drilled down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby pipe strings such as casings and liners may be cemented in well bores. In performing primary cementing, hydraulic cement compositions may be pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore.

A cement slurry is placed in the annulus and permitted to set into a hard mass (i.e., sheath) to thereby attach the string of pipe to the walls of the wellbore and seal the annulus. Once set, a cement sheath may be subjected to a variety of cyclic, shear, tensile, impact, flexural, and/or compressive stresses that may lead to failure of the cement sheath. Such failure may be the result of fractures, cracks, and/or debonding of the cement sheath from the pipe string and/or the formation. Undesirably, cement-sheath failure may lead to loss of zonal isolation, resulting, for example, in the undesirable migration of fluids between formation zones. This may lead to undesirable consequences such as lost production, costly remedial operations, environmental pollution, hazardous rig operations resulting from unexpected fluid flow from the formation caused by the loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe.

Subsequent secondary cementing operations may also be performed. One example of a secondary cementing operation is squeeze cementing whereby cement slurry is employed to plug and seal off undesirable flow passages in the cement sheath and/or the casing. Cement compositions also may be used in remedial cementing operations such as plugging highly permeable zones or fractures in well bores, plugging cracks and holes in pipe strings, and the like.

Cement compositions utilized in subterranean operations may be lightweight to prevent excessive hydrostatic pressure from being exerted on subterranean formations penetrated by the well bore, whereby the formations may be unintentionally fractured. In some environments, cementing operations may need lightweight cement slurries having reduced densities (e.g., a low-density slurry). For instance, cementing across highly depleted zones and weaker formations may need lightweight cement for sufficient circulation. If the cement cannot be successfully circulated, the desired level of annular fill may not be achieved, and consequently the desired seal may not be achieved. As a result, a large impact on the drilling cost may be experienced and delays in production delivery may occur due to the remedial work.

Cements are also commonly utilized above ground structures e.g., in construction, transportation and other industries. Examples of common above ground structures and materials made from cement include, but are not limited to, building materials (floors, beams, columns, roofing, piles, bricks, mortar, panels, plaster); transportation materials, (roads, pathways, crossings, bridges, sleepers, viaducts, tunnels, stabilization, runways, parking); water conduits (pipes, culverts, curbing, drains, canals, weirs, dams, tanks, pools); support structures (piers, docks, retaining walls, silos, warehousing, poles, pylons, fencing); agriculture structures (buildings, processing, housing, feedlots, irrigation); and even art objects (statues, sculptures, and statuaries). Each of these uses can benefit from the use of lightweight cement compositions.

One type of lightweight cement composition is a foamed cement composition, i.e., a cement composition that comprises a gas. The use of foaming agents to provide lightweight cement compositions was first shown in the early 1980's in, for example, U.S. Pat. Nos. 4,300,633 and 4,333,764. Subsequently, foamed cements, the use of foamers, and foam stabilizer based surfactant systems have been the subject of several patents. See, e.g., U.S. Pat. Nos. 5,711,801; 5,803,665; 5,897,699; 5,900,053; 5,966,693; 6,063,738; 6,227,294; 6,244,343; 6,336,505; 6,364,945; 6,367,550; 6,547,871; 6,797,054; 6,619,399; 6,955,294; 6,336,505; 6,953,505; 6,835,243; 7,008,477; 7,013,975; 7,191,834; 7,373,981; and 7,607,484 as well as in US Published Application 2010/0077938 A1. In addition to being lightweight, the gas contained in the foamed cement composition may improve the ability of the composition to maintain pressure. In subterranean applications, such as in wells, this prevents the flow of formation fluids into and through the cement composition during its transition time, i.e., the time during which the cement composition changes from a true fluid to a set mass. Foamed cement compositions may be advantageous because they can have low fluid loss properties and may act to prevent the loss of fluid during circulation. Additionally, foamed cement compositions when set should have a lower modulus of elasticity than non-foamed cements, which is often desirable as it enables the resultant set cement, inter alia, to resist hoop stresses exerted on the set cement in the annulus.

Lightweight and/or foamed cements have been prepared in a variety of ways, for example, by addition of water, microspheres or gas to the cement. See, e.g., the patents and published application cited above. Drawbacks to addition of extra water to the cement include reduced efficiency in solidifying of the cement. For instance, the additional water may dilute the cement and thereby extend the time at which the cement may set. Drawbacks to using microspheres include costs associated in adding a sufficient amount of microspheres to reduce the density of the cement to lower than typical densities. Drawbacks to adding gas include excess permeability at high gas concentrations. Consequently, there is a need in the art for an improved foamed cement composition for use both above ground and in subterranean environments.

When cement is used, a slurry of the cement dry components is prepared then poured into place and cured (hardened). The curing can take time. Additives known as accelerators are often added to accelerate cement's cure (or set) time and improve cure characteristics of the cement. Alkali silicates have been widely used as an accelerator for cements and concrete. They are seen as the most effective alkaline activators for cementing systems in general. Alkali silicates are also used in soil grouting in construction and sweep modification using gas/foam and gel formation in oil field applications. See, e.g., US Published Patent Application 2010/0038085. Silicates are also commonly-used in cementing operations to control cement density and set time. Silicates are used to overcome the negatives associated with water channeling, which are caused by the thinning of the cement slurry when water is added alone. As a water-based extender, the silicate reacts with calcium hydroxide in the cement slurry and produces a viscous gel. The water in the cement then becomes 'tied up' in the gel, allowing additional water to be added to the system. The density of cement slurry can also be extended or lowered by adding nitrogen gas or air or additives that forms gas to make extremely lightweight cement systems with preferred mechanical properties. Application rates for silicates in these applications are on the order 3% of the cement weight. Additionally, powdered aluminum or silicon metal have been used in various lightweight cementing applications. Silicates, particularly sodium silicate, are also used in soil cements for grouts. Such uses of silicates are described, for example, in U.S. Pat. Nos. 3,706,581; 4,333,764 and 4,300,633.

Cements, however, are quite complex. Applying these silicates is an art that typically requires many different additives and combinations to yield cement properties for each particular job depending on cost and logistics. Thus, there remains a need for cements and concretes containing silicates which may be easily dispersed in the cement without the requirements for such additives and combinations. This invention answers those needs.

SUMMARY OF THE INVENTION

The invention relates to cement compositions containing a metal silicide. Upon mixing with water, the metal silicide reacts to generate hydrogen gas, a silicate, and heat—each of which is advantageous for the large variety of uses to which cements are put. The generation of hydrogen acts as an in situ foaming of the cement or other compositions containing cements. Producing a silicate as direct reaction product provides silicates to the cement and the known benefits of silicates in cements.

In one embodiment, the invention relates to a foamable cement composition comprising about 99.999 wt % to about 98.5 wt % of a cement, and about 0.001 wt % to about 1.5 wt % of a metal silicide or a mixture of metal silicides. The cement may be any cement but may also be selected from an API class cement, a cement used for oil field applications, a hydraulic cement, a slag cement and mixtures thereof. The metal silicide may be an alkali metal silicide such as a lithium silicide, a sodium silicide, or a potassium silicide, or an alkaline earth metal silicide such as a calcium silicide and mixtures of such silicides.

Other embodiments of the invention provide method for forming cement structures. Water is added to a foamable cement composition of the invention to form a slurry. The foamed cement composition in the form of a slurry is introduced into a workspace and allowed to set in the workspace. In other embodiments the workspace is a subterranean structure and may be a well.

Another embodiment of the invention provides a concrete mix comprising about 10 wt % to about 30 wt % of a foamable cement composition of the invention; about 70 wt % to 90 wt % of aggregate; and up to about 20 wt % of one or more additives.

An embodiment of the invention also provides methods for forming a concrete structure comprising the steps of: adding water to a concrete mix of the invention to form a concrete slurry, introducing the concrete slurry into a workspace; and allowing the foamed cement composition to set in the workspace.

A further embodiment of the invention is a grout comprising about 15 wt % to about 55 wt % of a foamable cement composition of the invention and about 45 wt % to 85 wt % of sand.

Another embodiment of the invention provides a method for forming grout structure comprising the steps of adding water to a grout of the invention to form a grout slurry, introducing the grout slurry into a workspace; and allowing the grout slurry to set in the workspace.

Another embodiment of the invention relates to a method for stabilizing soil comprising the steps of adding water to a foamable cement composition of the invention, a concrete mix of the invention or a grout of the invention to form a slurry; injecting the slurry into soil; and allowing the slurry to harden in the soil to form a solid mass.

DESCRIPTION OF THE INVENTION

Figure 1:
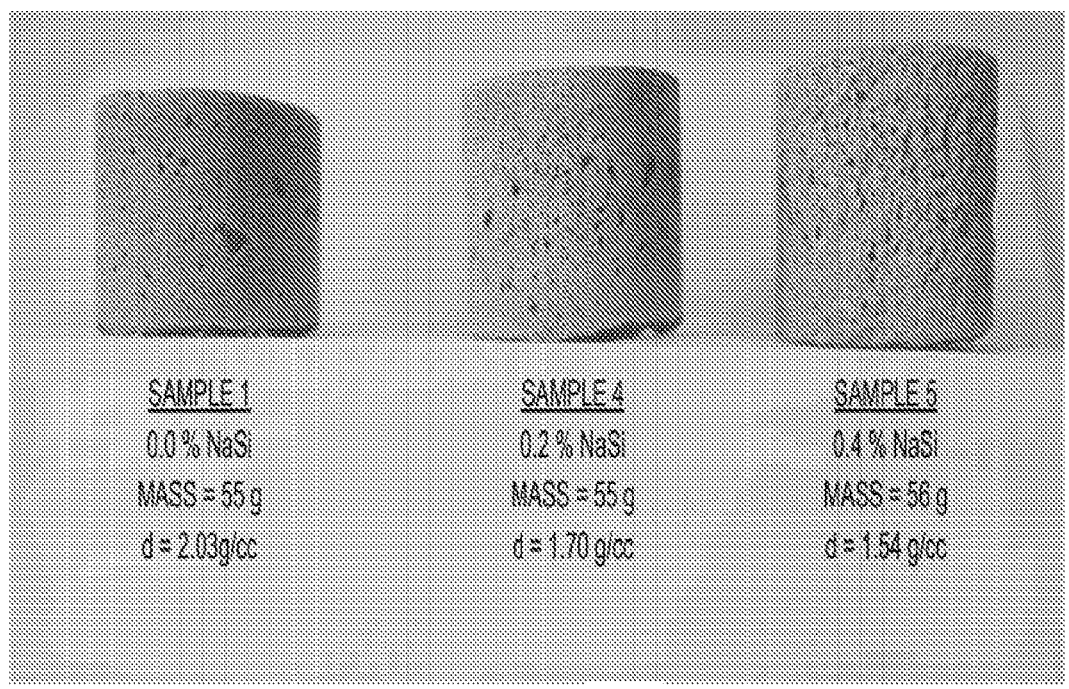
FIG. 1 is a photograph of concrete samples prepared as described in Example 1, with and without sodium silicide.

The invention relates to a cement composition containing about 99.99 wt % to about 98.5 wt % of a cement, and about 0.001 wt % to about 1.5 wt % of a metal silicide or a mixture of metal silicides. In other embodiments, a cement of the invention contains about 0.01 wt % to about 1 wt % of a metal silicide or about 0.3 wt % to about 1 wt % of a metal silicide or a mixture of metal silicides. Upon mixing with water, the metal silicide reacts to generate hydrogen gas, a silicate, and heat—each of which is advantageous for the large variety of uses to which cements are put. The generation of hydrogen acts as an in situ foamer of the cement or other compositions containing cements, such as concrete or grout. Having a silicate as direct reaction product provides silicates to the cement together with the known benefits of silicates in cements. The heat generated can assist in curing the cement. With the silicate gelling and hydrogen generation characteristics provided by the presence of an alkali metal silicide, the invention provides a more environmentally-friendly and cost-effective method to control concrete density and thereby improve integrity of cements in a variety of operations, including subterranean and wellbore operations. The various components of a foamable cement composition of the invention, its various uses and other embodiments of the invention are discussed below. The invention is discussed with reference to patents and published applications—the disclosures of which are specifically incorporated herein by reference.

Cements: Suitable cements for use in the invention include, without limitation, all API classes of cements, other cements used in oil field applications, hydraulic cements, and other materials exhibiting pozzolonic properties, e. g. a slag cement, as well as mixtures or combinations thereof. A hydraulic cement is one that, when water is added, undergoes a chemical reaction known as hydration to harden or cure the cement. The hydration reaction allows the cement to harden underwater and remain strong even in wet conditions. Hydraulic cements include, but are not limited to, Portland cements, pozzolanic cements, gypsum cements, high alumina content cements, slag cements, silica cements, and combinations thereof. Portland cements suitable for use in the invention include those classified as Classes A through H according to American Petroleum Institute, API Specification for Materials and Testing for Well Cements, API Specification 10, Fifth Ed., Jul. 1, 1990. In certain embodiments, API Class A, C, G or H hydraulic cements may be preferred. The cement may also be an expandable or expansive cement which can undergo a net expansion or volume increase over its slurry phase and compensate for any cement shrinkage. Expandable cements are described, for example, in U.S. Pat. Nos. 4,002,483; 4,394,174 and 4,797159.

Metal Silicides: The metal silicide may be an alkali metal silicide or an alkaline earth metal silicide and mixtures of such silicides. The metal silicide is used as a powder. In one embodiment, the metal silicide powder has a particle size of up to about 250 microns. In another embodiment, the particles size may less than about 100 microns. Alkali metal silicides are described in U.S. Pat. No. 7,811,541, which is incorporated here by reference. An example of an alkaline earth metal silicide is a calcium (Ca) silicide. In one embodiment of the invention the metal silicide is alkali metal silicide which includes, for example, the silicides of lithium, (Li); sodium, (Na); and potassium, (K). Mixtures of metal silicides may be used as the metal silicide in the invention. Included within such mixtures are combinations of metal silicides as well as mixed-metal silicides. In other words, the metal in the metal silicide may be an individual metal, e.g., Ca, Na or K, or the metal may be a combination of metals, e.g., Ca and Na, Na and K, or Ca, Na and K,—a mixed-metal silicide. Mixtures of all such silicides may be used. The various embodiments of the invention are discussed below in terms of alkali metal silicides as representative of the metal silicides which may used in the invention.

Alkali metal silicides are available from SiGNa Chemistry, Inc. of New York, N.Y. They are free-flowing powders that may be easily handled in dry air. The alkali metal silicides do not react with oxygen and only slowly absorb water from the atmosphere and without ignition. In an embodiment of the invention the alkali metal silicide is a sodium silicide (preferably having a 1:1 Na:Si molar ratio, e.g. NaSi or $Na_4Si_4$) or a potassium silicide (preferably having a 1:1 K:Si molar ratio, e.g. KSi or $K_4Si_4$). As illustrated by the chemical equation (I) for $Na_4Si_4$, alkali metal silicides react with water to produce hydrogen gas, the corresponding alkali metal silicate, and heat. See reaction (I) below. As discussed above mixtures of alkali metal silicides may be used in the cement compositions of the invention.

$$Na_4Si_4(s)+10H_2O(l) \rightarrow 10H_2(g)+2Na_2Si_2O_5(s)+\text{heat} \qquad (I)$$

This reaction proceeds smoothly at room temperature and without the need of a catalyst.

In a foamable cement composition of the invention, the alkali metal silicide reacts with water mixed with the cement composition in the normal course of using the cement. As shown by the reaction, a small amount of sodium silicide added to cement (quantitatively 2 gm yields 2.4 liters of gas at STP). Release of hydrogen gas, the alkali metal silicide acts as a foaming agent. This creates a foamed cement matrix in situ as the silicide reacts with water releasing hydrogen gas. The reaction also generated a corresponding metal silicate which too becomes part of the foamed cement matrix. The production of the corresponding alkali metal silicate thus introduces an activator throughout the cement. The heat generated by the reaction promotes rapid initial green strength of the cement. Both the hydrogen gas foaming agent and the alkali metal silicate are formed in situ and with near or complete homogeneity throughout the cement. Additionally, the fact that the silicide reaction consumes water, which can vary in the other components of cement, may be an added value in situations where the control and maintenance of the cement slurry viscosity is desired.

The alkali metal silicide, as discussed above, is a free flowing powder which may be dry mixed into a cement composition of the invention using techniques known in the art. For example, an alkali silicide powder may be first mixed with one or several of the cement components which can be subsequently mixed with remaining components just prior to use. Suitable mixing techniques include, but are not limited to, dual injection processes such as described in U.S. Pat. No. 4,064,941 to prevent mixing until the desired placement is achieved as described in U.S. Pat. No. 5,289,877. Direct mixing in this way allows the alkali metal silicide to react immediately upon mixing the cement with water. When the alkali metal silicide and cement are pre-mixed as a foamable cement composition of the invention, the pre-mix cement composition may be packaged in water impermeable bags or containers.

Alternatively, when delayed or controlled release of the alkali metal silicide is desired the alkali metal silicide powder may be coated to protect the alkali metal silicide from the environment. Employing a coated powder, the alkali metal silicide may be prevented or delayed from reacting with the water in the cement slurry until the desired cement placement is achieved. This is particularly useful in subterranean structures. Suitable coating compositions and methods of coating active powders are known in the art and described, for example, in U.S. Pat. Nos. 6,224,793 and 7,179,766, which are incorporated here by reference. For underground applications possible coating might include but is not limited to various thermal-controlled-melt waxes. Suitable waxes include plant waxes, animal waxes (e.g. beeswax), petroleum-derived waxes, Montan wax and synthetic waxes (e.g. polyethylene waxes) as well as mixtures of such waxes. In one embodiment, the coating material may be a thermal-controlled-melt wax or crystallizable or thermoplastic polymer composition. See, e.g., U.S. Pat. No. 6,224,793. Such materials can be designed and tailored to the particular reservoir temperature so that softening and coating breakdown is naturally triggered upon reaching temperature at a desired subterranean depth. Alternatively, the coating can be designed to breakdown just above the particular environmental temperature so that a follow on shot of fluid at sufficient temperature triggers the breakdown. Once a portion of the metal silicide begins to react sufficient heat is generated to propagate the reaction throughout the foamable cement composition. Using delayed or controlled release of the alkali metal silicide, allows for contact with water and the generation of hydrogen, silicates, and heat until and at the location that it will provide the maximum benefit.

Additives: A foamable cement composition of the invention may contain additives known in the art for cements and other materials which are made using a cement base. The additives may be added to a foamable cement composition of the invention to improve or adjust its properties, its use in cementing, and/or the properties of the final cement structure or product. Common cement additives include, but are not limited, accelerators/accelerants to speed up hydration, that is curing (or hardening) of the cement, set retarders to slow the curing (or hardening)/hydration of the cement, plasticizers, pigments, corrosion inhibitors, viscosity modifiers, bonding agents, pumping aids, salts, defoamers, fluid loss reducing agents, settling prevention agents, gas migration prevention additives, weighting materials, dispersants, vitrified shale, formation conditioning agents, and combinations thereof. Other mechanical property modifying additives, for example, carbon fibers, glass fibers, metal fibers, minerals fibers, thermoplastic elastomers such as styrene butadiene or acrylonitrile-styrene-butadiene random or block polymers, and latex emulsions, for example styrene-butadiene latexes, and the like can be added to further modify the mechanical properties. Typically cement will contain mixtures of such additives. The additives may be used for the art-recognized purpose and in the general amounts known for them in the art. Generally speaking, additives may comprise up to about 20 weight percent of a cement composition. Individual additives are generally present in amounts of about 0.1 weight percent to about 10 weight percent. The addition of an additive to the cement composition may be accomplished by any suitable method. Particular additives which may be used in one or more embodiments of the invention are described below.

A foaming agent, such as a surfactant or combination of surfactants, may be added to a foamable cement composition of the invention to stabilize the foamed cement. The foaming agent is typically present in an amount ranging from about 0.1 wt % to about 3 wt %. The foaming agent should be stable in the alkaline environment of the cement composition. A surfactant useable in the cement compositions of the invention may be a cationic surfactant or a mixture of cationic surfactants, or an anionic surfactant or a mixture of anionic surfactants. Exemplary surfactants include, but are not limited to, abietic acid salts, sodium alkyl-aryl sulfonates, phenol-ethoxylates and perfluoroalkyl betaine. US Published Patent Application 2010/0077938 A1 describes the use of such surfactants in foamable cement compositions and lists foaming agents and surfactants which may be used in the compositions of the invention.

A foamable cement composition of the invention may also include an expanding additive. The expanding additive may be any component that enables the hydrogen gas generated from the alkali silicide to become incorporated into the cement composition. Suitable expanding additives are generally used in particulate form and include, but are not limited to, aluminum powder, gypsum blends, deadburned magnesium oxide, and combinations thereof. Examples of expanding additives comprising aluminum powder that are commercially available include GAS-CHEK and SUPER CBL from Halliburton Energy Services, Inc. An example of an expanding additive comprising a blend containing gypsum is commercially available as MICROBOND from Halliburton Energy Services, Inc. In addition, examples of expanding additives comprising deadburned magnesium oxide are commercially available as MICROBOND M and MICROBOND HT from Halliburton Energy Services. Inc. Such expanding additives are described in U.S. Pat. Nos. 4,304,298; 4,340,427; 4,367,093; 4,450,010 and 4,565,578.

The cement composition may also contain other density reducing additives to provide a desired density of the cement composition. The cement composition may include density reducing additives that are compatible with a subterranean cement composition (i.e., that are chemically stable at least until the cement sets). Without limitation, examples of density reducing additives include hollow glass beads, pozzolanic microspheres, solid beads (e.g., solid organic or plastic beads), or combinations thereof. An example of a suitable hollow glass bead is commercially available from 3M Company as SCOTCHLITE. An example of a suitable microsphere is commercially available from Halliburton Energy Services, Inc. as SPHERELITE. In addition, an example of a suitable solid bead is commercially available from Halliburton Energy Services, Inc. as FDP-C665. The density reducing additives may be added to the cement composition by any suitable method including dry blending with the cement before the addition of water, mixing with the water to be added to the cement, or by mixing with the cement slurry consecutively with or after the addition of the water. In another embodiment, the density reducing additives may be pre-suspended in water and injected into the cement mix fluid or injected into the cement slurry as an aqueous slurry.

General Uses: A foamable cement composition of the invention may be used in the same manner and in the same utilities as known for cements in general. A foamable cement composition of the invention may be used, then, in cementing operations where the cement is displaced into a workspace and allowed to set. In an embodiment, the foamable cement compositions are used in "above ground" applications, such as discussed above, to cement a workspace. A foamable cement composition of the invention may be used to form structures in place or may be used to make preformed structures including but not limited to, building blocks, paving blocks, statues, pots,—any pre-formed cement material. In the case of a pre-formed cement structure, the workspace may be a mold. As another example, a metal silicide may be mixed with a specialty cement to form a foamable cement of the invention which can then be used in guniting applications where rapidly foaming lightweight acid resistant cements are desired for refractory situations.

One embodiment of the invention comprises the steps of adding water to a foamable cement composition of the invention to form a cement slurry, introducing the slurry into a workspace, and curing the cement slurry in the workplace. Where the workspace is a mold, the mold is removed after sufficient curing to form a cement structure in the shape of the mold. When using a foamable cement composition of the invention, water is added to the foamable cement composition to form a cement slurry that can be introduced into the workspace. The slurry should contain a sufficient amount of water to flow and, in one embodiment, sufficient water to form a pumpable slurry. A slurry containing a foamable cement composition of the invention and water represents another embodiment of the invention. The water used to form the slurry may be fresh water or salt water, e.g., an unsaturated aqueous salt solution or a saturated aqueous salt solution such as brine or seawater, or a non-aqueous fluid. To begin the hydration reaction, generally requires a water-cement weight ratio of about 1:4 often given as a proportion: 0.25. However, a mix with a water-cement ratio of 0.25 may not mix thoroughly or form a slurry which flows well enough to be placed in the desired workspace. As is known in the art, more water may be used than is technically necessary to react with the cement. As is known in the art, the amount of water will depend on the particular composition and the planned use. Different amounts of water may used to achieve different advantages, for example, in pouring the slurry or curing of a given composition. Exemplary water-cement ratios which may be used range from about 0.2 to about 2. In some embodiments, the water may be present in the amount from about 20 to about 180 percent by weight of cement, alternatively from about 28 to about 60 percent by weight of cement.

Subterranean Uses: In one embodiment, the invention provides a method for cementing a subterranean workspace or formation. The method introduces a foamed cement in the form of a slurry into the subterranean workspace or formation and then allows the foamed cement to set in the subterranean formation. The subterranean formation may be a natural structure such as a hole, a cave, soil, etc. or a manmade structure such as a well, a tunnel, a channel, an excavation, etc.

In another embodiment, a foamable cement composition is used in a subterranean workspace, for example in cementing a well or underground pipe such as sewer pipe or wellbore casing. This cementing may be a primary cementing of a well or underground pipe or it may be a secondary cementing of a well or underground pipe.

In one embodiment, the cement compositions may be employed in securing conduit inside a wellbore for the recovery of natural resources such as water or hydrocarbons. This process, sometimes referred to as primary cementing generally involves drilling a wellbore to a desired depth such that the wellbore penetrates a subterranean formation while circulating a drilling fluid through the wellbore. Subsequent to drilling the wellbore, at least one conduit may be placed in the wellbore while leaving a space known as the annulus between the wall of the conduit and the wall of the wellbore. The cement composition may then be conveyed downhole and up through the annulus. The foamable cement composition sets into a hard mass, which forms a cement column that isolates an adjacent portion of the subterranean formation and provides support to the adjacent conduit.

One particularly useful embodiment of the invention is a method of cementing casing in an oil or gas well. When an oil or gas well is drilled from the surface to a hydrocarbon reservoir, steel pipe known as casing is used to line the well bore. This casing is required to maintain the integrity of the wellbore for the life of the well, typically 40 years or more. Cement is used to hold the casing in place, to support the physical load on the casing, to protect the casing from corrosion, and to prevent formation fluids from moving up the annulus between the casing and the well bore. The cementing of casing is one of the most critical steps involved in the long term successful completion of an oil or gas well. In one embodiment of the method of cementing casing, casing is lowered or run into the wellbore. The casing is filled with drilling mud, generally by mud pumps. A foamable cement composition of the invention, preferable comprising cement and an alkali metal silicide, is then provided. In a preferred method, the cement composition is mixed with water to generate a cement slurry in accord with the descriptions included herein. As will be recognized by those of skill in the art, the desired properties of the cement including density, viscosity, set time, as well as the volume needed to at least partially fill the annulus should be calculated prior to preparation of the cement slurry. Before introducing the cement slurry into the casing, preferably a mud plug is introduced into the casing which minimizes mixing of the drilling mud and cement slurry. The cement slurry is then introduced into the casing, preferably by pumping into the casing above the mud plug. Once the correct amount of the cement slurry of the invention has been pumped into the casing, preferably a second mud plug is introduced into the casing on top of the cement. Mud is then pumped continuously down the casing until the bottom mud plug hits a float collar at the bottom of the casing string and ruptures allowing the cement to be forced out of the bottom of the casing and up the annulus between the outside of the casing and the well bore. Mud continues to be pumped into the casing until the top mud plug hits the bottom plug at the float collar and seals the casing at the bottom. The cement slurry filling the annulus and surrounding the casing is then allowed to set. As will be recognized the cementing method of the present invention is not dependent upon utilizing the two mud plugs, but also includes use of a single plug or no plugs.

The foamable cement composition of the present invention can likewise be utilized in other down hole cementing applications such as repairing a poor initial cementing job, repairing leaks, sealing off depleted zones, plugging wells, etc. In one such additional embodiment, a foamable cement composition of the invention may be employed in a process generally known as squeeze cementing. In this alternate embodiment of the invention a predetermined amount of a cement slurry in accord with the invention is introduced into the inside of a casing string in a well bore, preferably by pumping. A predetermined amount of cement slurry is preferably pumped into the casing such that it fills the well to or near the perforations or leaks in the casing. The cement is then forced under pressure through the perforations or leaks into permeable zones. The cement slurry sets within the perforations or permeable zones, thereby forming a hard mass to prevent fluid from leaking between the zones.

Compositions Containing a Foamable Cement Composition: As mentioned above, a foamable cement composition of the invention may be used in the same manner and in the same utilities as known for cements in general. This includes use as a component part of other compositions such as, but not limited to, concretes and grouts.

A cement of the invention may be used to make lightweight concrete. Concrete containing a cement of the invention is another embodiment of the invention. As is known in the art, a concrete is basically a mixture of aggregates and paste. The aggregates are sand and gravel or crushed stone; the paste is water and a cement of the invention. The weight or density of the concrete is reduced by the foaming action of the alkali metal silicide in the cement. A lightweight concrete of the invention is one that is less dense or weighs less than the corresponding concrete absent the alkali metal silicide.

One embodiment of the invention relates to a concrete mixture comprising about 10 wt % to about 30 wt % of a foamable cement composition about 70 wt % to 90 wt % aggregate. Aggregate, as is known in the art, may be but is not limited to, crushed stone, rock and/or sand. The exact proportions vary depending on the type of concrete being made as is known in the art.

As with the foamable cement composition discussed above, a concrete mix of the invention may contain additives known in the art for concretes. Such additives include, but are not limited to, accelerants, retarders, plasticizers, pigments, corrosion inhibitors, dispersing agents, and other additives, such as and including those discussed above. Such additives may be used for the art-recognized purpose and in the general amounts known for them in the art. The addition of an additive to the cement composition may be accomplished by any suitable method.

As discussed above regarding the foamable cement compositions of the invention, a concrete mix of the invention, the aggregate and cement, are mixed thoroughly with water to form a concrete slurry, another embodiment of the invention. This starts the chemical reaction causing the cement to cure and set. Before this happens and the concrete hardens, the concrete slurry can be poured into a workspace, as discussed above, so that it will harden in a desired shape or location.

In the same way as for a foamable cement composition of the invention, a concrete mix of the invention may be used in the same manner and in the same utilities as known for concretes in general. This includes the uses described above as well as other uses known in the art. A concrete mix of the invention may be used, then, in operations where the concrete slurry is displaced into a workspace and allowed to set. As is known in the art, a grout slurry will contain water in the same proportions discussed above with regard to cements. In one embodiment, the invention provides a method for cementing a subterranean workspace or formation as described above using a concrete mix of the invention. The subterranean workspace or formation may be a natural formation or a manmade structure such as discussed above. For a well, the cementing may be a primary or a secondary cementing of the well.

The foamable cement compositions of the invention may also be used in grouts. As is known in the art, a grout typically contains cement, sand, and optionally, one or more pigments as well as other grout additives. One embodiment of the invention is a grout comprising about 15 wt % to about 55 wt % of a foamable cement composition, and about 45 wt % to 85 wt % of sand. Grout, though having similar ingredients to concrete, is more fluid and has greater plasticity than concrete. Various grouts are described, for example, in U.S. Pat. Nos. 5,241,993; 5,454,866; 5,769,939; 5,803,665; and 6,251,179.

As with the foamable cement composition discussed above, a grout of the invention may contain additives known in the art for grouts. Such additives include, but are not limited to, accelerants, retarders, plasticizers, corrosion inhibitors, dispersing agents, and other additives, such as and including those discussed above Such additives may be used for the art-recognized purpose and in the general amounts known for them in the art. The addition of an additive to the cement composition may be accomplished by any suitable method.

A grout of the invention may be used in the same manner and in the same utilities as known for grouts in general. This includes the uses described above as well as other uses known in the art. A grout of the invention may be used, then, in operations where the grout slurry is displaced into a workspace and allowed to set. A grout may be thoroughly mixed with water to form a grout slurry, another embodiment of the invention. This starts the chemical reaction causing the cement within the grout to cure and set. Before this happens and the grout hardens, the grout slurry can be poured into a workspace, as discussed above, so that it will harden in a desired shape or location. As is known in the art, a grout slurry will contain water in the same proportions discussed above with regard to cements. Accordingly, an embodiment of the invention provides a method for forming grout structure comprising the steps of adding water to a grout of the invention to form a grout slurry, introducing the grout slurry into a workspace; and allowing the grout slurry to set in the workspace. In one embodiment, the invention provides a method for cementing a subterranean workspace or formation as described above using a grout of the invention. The subterranean workspace or formation may be a natural formation or a manmade structure such as discussed above. For a well, the cementing may be a primary or a secondary cementing of the well.

In another embodiment, a foamble cement composition, a concrete mix or a grout of the invention may be used in a soil grout and a method for stabilizing soil. Soil grouting denotes a process of stabilizing sand, soil, subsoil or similar substrates in order to increase the strength and load bearing characteristics of the area and to seal off water or liquid flows in the grouted area. Soil grouts and methods for using them are known in the art as described, for example, in U.S. Pat. No. 3,706,581. The term "soil" is used herein to designate any geological matter having sufficient porosity to permit impregnation by the method of the present invention. Consolidation of loose soils by impregnating, mixing with or injecting into the soil, substances having a binding action is of great importance in many civil engineering, mining and drilling operations. Use of a foamable cement composition, a concrete nix or a grout of the invention for soil grouting answers a demand for compositions which can be injected into porous ground so as to form a substantially compact and impervious mass. Another embodiment of the invention, then, relates to a method for stabilizing soil comprising the steps of adding water to a foamable cement composition of the invention, a concrete mix of the invention or a grout of the invention to form a slurry; injecting the slurry into soil; and allowing the slurry to harden in the soil to form a solid mass.

It is also envisioned that a foamable cement composition, a concrete mix or a grout of the invention, may be packaged in water impermeable bags or containers.

EXAMPLES

The following examples are illustrative and should not be construed as limiting the scope of the invention or claims thereof. The examples were performed using cement moulds made from cutting roughly 2-3 inch lengths of PVC tubing with ID values between 1 and 1.5 inches. The bottom of the mould was made with removable plastic film. The cement formulations were mixed with a water/surfactant mixture with steady stirring in a 250 mL glass beaker. Surfactant was added in all test cases by making up water/surfactant solutions for use in preparing the hardened products. The water containing the surfactant was made by adding a commercial concentrated liquid hand cleaner to all water used for testing. The cleaner was added to the water at a ratio of 1 drop of liquid soap to 10 mL of water. Once the formulation was at the proper consistency it was transferred to a mould with gentle tapping and allowed to set. The final height of the specimen was measured as well as the mould inner diameter to calculate the density of the cement. Samples were then stored in polyethylene bags also containing a small open beaker of water in order to maintain a high humidity during setting.

Compressive strengths of the samples were determined by placing each sample in a manual Hydraulic, Bench Top Carver Press and noting the force in pounds at which the cement sample failed. The compressive strength in psi was calculated using the cross-sectional area of each specimen. All samples were aged for 30 days or more before testing under ambient conditions.

Example 1

A commercial concrete, 50 grams of Quikrete® Concrete Mix (No. 1101), a blend of portland cement (10-30 wt %), sand (70-90 wt %), and lime (0-5 wt %,) was mixed with powdered sodium silicide, sized 100 μm and less, in quantities from 0.0 to 0.6 wt % based on the weight of the final formulation. Table 1 shows the composition of each sample, water/surfactant added, mould values, final density and compressive strength. The results show that the addition of sodium silicide reduces the density of the concrete in this case by over 20% at silicide contents between 0.2 and 0.6 wt % while producing strength versus density results consistent with systems of this type (discussed below). FIG. 1 shows representative specimens of hardened concrete prepared in the example. As can be seen from FIG. 1 the addition of sodium silicide has decreased cement density by generating a uniformly porous concrete product.

TABLE 1

Quikrete ® Concrete Containing Sodium Silicide

| Sample | NaSi content (wt %) | Water/ Surfactant (g) | mould ID (cm) | Cement Height (cm) | Cement Mass (g) | density (g/cc) | Compressive strength (psi) |
|---|---|---|---|---|---|---|---|
| 1 | 0.0% | 6.2 | 3.50 | 2.80 | 54.6 | 2.03 | 3300 |
| 2 | 0.1% | 6.9 | 3.50 | 2.95 | 54.1 | 1.91 | 2200 |
| 3 | 0.2% | 7.4 | 3.50 | 3.30 | 50.7 | 1.60 | ND |
| 4 | 0.2% | 7.4 | 3.50 | 3.35 | 54.6 | 1.70 | 1800 |
| 5 | 0.4% | 8.0 | 3.50 | 3.75 | 55.6 | 1.54 | 1000 |
| 6 | 0.6% | 8.4 | 3.50 | 3.20 | 47.7 | 1.55 | 1150 |

Example 2

Commercial hydraulic cement, 32 grams DRYLOK® FAST PLUG cement, a blend of sand (40 wt %), portland cement (40 wt %), hydraulic calcium aluminate cement (15 wt %) and lime (<5 wt %) was mixed with sized powdered sodium silicide, sized 850 μm and less, in quantities from 0.0 to 1.1 wt % based on the weight of the final formulation. Table 2 shows the composition of each sample, water/surfactant added, mould values, final density and compressive strength. The results for Example 2 show that the addition of sodium silicide can reduce the density of the cement in this case by over 30% at a silicide content of 0.6%. These samples were less dense than those in Example 1 due to the higher Sand to portland cement ratio in Example 1 (roughly 3:1) versus this example where the ratio here was 1:1.

TABLE 2

DRYLOK ® Cement Containing Sodium Silicide

| Sample | NaSi content (%) | Water/ Surfactant (g) | mould ID (cm) | Cement Height (cm) | Cement Mass (g) | density (g/cc) | Compressive strength (psi) |
|---|---|---|---|---|---|---|---|
| 1 | 0.0% | 10.0 | 2.54 | 3.4 | 33.0 | 1.70 | 1650 |
| 2 | 0.2% | 10.8 | 2.54 | 5.0 | 35.2 | 1.26 | 650 |
| 3 | 0.6% | 10.8 | 2.54 | 5.3 | 35.5 | 1.20 | 250 |
| 4 | 1.1% | 10.8 | 2.54 | 4.0 | 31.5 | 1.41 | 250 |
| 5 | 1.1% | 10.8 | 2.54 | 3.6 | 27.9 | 1.38 | 650 |

Strength to Density Relationships

Figure 2:
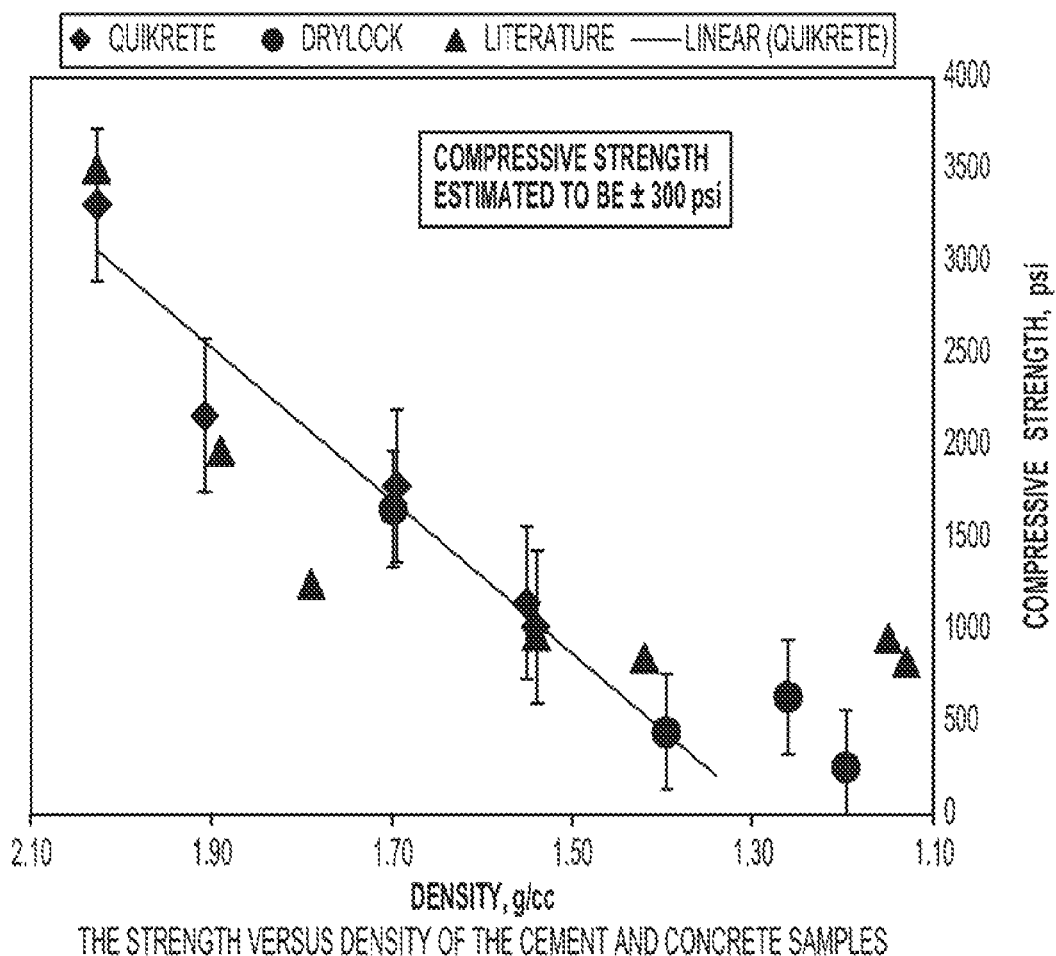
FIG. 2 is a plot of strength versus density of the cement and concrete samples of the invention and of the prior art.

The strength to density relationship observed for silicide-foamed cements is consistent with typical results observed for controlled density-foamed well cements. This is shown in FIG. 2 where the strength to density results for Examples 1 and 2 are plotted along with results from a study of controlled density-foamed cements designed for Coalbed Methane wells. S. Irawan, C. W. Sum, M. B. Jasamai, S. Q. Tunio, A. G. J. Wang, "Foamed Cement Properties for Zonal Isolation in Coal Bed Methane (CBM) Wells", International Journal of Applied Science and Technology, Vol. 1 No. 2; April 2011, p. 65. The cements formed in the literature study were prepared using base slurry mixed with a standard constant speed mixer. The water to cement ratio was varied to obtain a range of density values for neat slurries—without foam (the cements with density >1.75 g/cc). Foam was generated using a portable foam generator to obtain a range of lower cement density values. The methane well cement results are shown in FIG. 2 by the solid gray triangles. Cements foamed using sodium silicide show physical properties comparable to or even superior to the referenced controlled density-foamed material.

The claimed invention is:
1. A foamable cement composition comprising:
   about 99.999 wt % to about 98.5 wt % of a cement, and
   about 0.001 wt % to about 1.5 wt % of an alkali metal silicide or an alkaline earth metal silicide or a mixture of said metal silicides.
2. A foamable cement composition of claim 1, wherein
   the cement is selected from an API class cement, a cement used for oil field applications, a hydraulic cement, a slag cement and mixtures thereof; and
   the alkali metal silicide or the alkaline earth metal silicide or mixture of metal silicides is an alkali metal silicide selected from a lithium silicide, a sodium silicide, a potassium silicide, and mixtures thereof.
3. A foamable cement composition of claim 1 or 2, wherein the alkali metal silicide is a coated powder.
4. A foamable cement composition of claim 1 or 2, further comprising about 0.1 wt % to about 1.499 wt % of a surfactant.
5. A method for forming a cement structure comprising the steps of:
   adding water to a foamable cement composition of claim 1 to form a slurry,
   introducing the foamable cement composition in the form of a slurry into a workspace; and
   allowing the foamable cement composition to set in the workspace.
6. A method of claim 5, wherein
   the cement is selected from an API class cement, a cement used for oil field applications, a hydraulic cement, a slag cement and mixtures thereof; and the alkali metal silicide or the alkaline earth metal silicide or mixture of metal silicides is an alkali metal silicide selected from a sodium silicide, a potassium silicide and mixtures thereof.

7. A method for cementing a subterranean formation comprising the steps of:
   introducing a foamable cement composition of claim 1 in the form of a water-based slurry into the subterranean formation, and
   allowing the foamable cement composition to set in the subterranean formation.

8. A method of claim 7, further comprising, prior to the introducing step, the step of:
   adding water to the foamable cement composition to form the slurry.

9. A method of claim 7 or 8, wherein the cement is selected from an API class cement, a cement used for oil field applications, a hydraulic cement and mixtures thereof; and
   the alkali metal silicide or the alkaline earth metal silicide or mixture of metal silicides is an alkali metal silicide selected from a sodium silicide, a potassium silicide and mixtures thereof.

10. A method for cementing a subterranean formation of claim 7 or 8, wherein the subterranean formation is a well including a borehole and a pipe extending vertically within the borehole and the introducing step introduces the slurry of a foamable cement composition into a vertically extensive column within an annular space between the pipe and the borehole of the well.

11. A method for cementing a subterranean formation of claim 7 or 8, wherein the subterranean formation is a well and the method is a secondary cementing of the well.

12. A concrete mix comprising:
    about 10 wt % to about 30 wt % of a foamable cement composition of claim 1;
    about 70 wt % to 90 wt % of aggregate; and
    up to about 20 wt % of one or more additives.

13. A concrete mix of claim 12, wherein
    the cement is selected from an API class cement, a cement used for oil field applications, a hydraulic cement, a slag cement, and mixtures thereof;
    the alkali metal silicide or the alkaline earth metal silicide or mixture of metal silicides is an alkali metal silicide selected from a sodium silicide, a potassium silicide and mixtures thereof; and
    the aggregate is selected from crushed stone, rock, sand and mixtures thereof.

14. A method for forming a concrete structure comprising the steps of:
    adding water to a concrete mix of claim 12 or 13 to form a concrete slurry,
    introducing the concrete slurry into a workspace; and
    allowing the concrete slurry to set in the workspace.

15. A method for forming a concrete structure of claim 14, wherein the workspace is a well comprising a borehole and a pipe extending vertically within borehole and the introducing step introduces the concrete slurry into a vertically extensive column within an annular space between the pipe and the borehole of the well.

16. A method for forming a concrete structure of claim 15, wherein the method is a secondary cementing of the well.

17. A grout comprising:
    about 15 wt % to about 55 wt % of a foamable cement composition of claim 1; and
    about 45 wt % to 85 wt % of sand.

18. A grout of claim 17, wherein
    the cement is selected from an API class cement, a cement used for oil field applications, a hydraulic cement, a slag cement, and mixtures thereof; and
    the alkali metal silicide or the alkaline earth metal silicide or mixture of metal silicides is an alkali metal silicide selected from a sodium silicide, a potassium silicide and mixtures thereof.

19. A method for forming grout structure comprising the steps of:
    adding water to a grout of claim 17 or 18 to form a grout slurry,
    introducing the grout slurry into a workspace; and
    allowing the grout slurry to set in the workspace.

20. A method for forming a grout structure of claim 19, wherein the workspace is a well comprising a borehole and a pipe extending vertically within the borehole and the introducing step introduces the grout slurry into a vertically extensive column within an annular space between the pipe and the borehole of the well.

21. A method for forming a grout structure of claim 20, wherein the method is a secondary cementing of the well.

22. A method for stabilizing soil comprising the steps of:
    adding water to a foamable cement composition of claim 1, a concrete mix of claim 12 or a grout of claim 17 to form a slurry;
    injecting the slurry into soil; and
    allowing the slurry to harden in the soil to form a solid mass.

* * * * *